United States Patent [19]

Bunn et al.

[11] 4,273,522

[45] Jun. 16, 1981

[54] REINFORCING MEMBER SUPPORT IN CONCRETE EXTRUDERS

[75] Inventors: Norman W. Bunn, West Vancouver; Christopher B. Bunn, North Vancouver, both of Canada

[73] Assignee: Dyform Engineering Limited, Vancouver, Canada

[21] Appl. No.: 76,294

[22] Filed: Sep. 17, 1979

[51] Int. Cl.[3] .......................... B28B 23/18; B29C 3/00

[52] U.S. Cl. .................................... 425/113; 425/122; 425/129 R; 425/447; 425/456

[58] Field of Search ........... 425/113, 114, 122, 129 R, 425/63, 64, 447, 456; 264/174, 228, 333

[56] References Cited

U.S. PATENT DOCUMENTS

| | | | |
|---|---|---|---|
| 3,049,787 | 8/1962 | Hannan et al. | 425/111 |
| 3,161,117 | 12/1964 | Supject | 425/113 |
| 3,170,968 | 2/1965 | Rokunohe et al. | 264/174 |
| 3,172,931 | 3/1965 | Peterson | 264/174 |
| 3,200,177 | 8/1965 | Dodd | 425/114 |
| 3,877,860 | 4/1975 | Putti | 425/64 |
| 3,979,488 | 9/1976 | Greenhalgh | 264/174 |
| 3,994,639 | 11/1976 | Hewitt | 425/113 |
| 3,997,285 | 12/1976 | Miyazaki | 425/113 |
| 4,174,935 | 11/1979 | Driskill | 425/113 |

*Primary Examiner*—W. E. Hoag

*Attorney, Agent, or Firm*—Fulwider, Patton, Rieber, Lee & Utecht

[57] ABSTRACT

A machine for making elongated articles of concrete or the like having reinforcing members extending therethrough, and in which at least one spiral conveyor forces concrete under pressure through a mold causing the machine to move forwardly by reaction as the material is forced against the molded portion of the article. At least one elongated reinforcing member extends through the machine and the mold, and the machine is provided with a support tube extending to the mold to receive the reinforcing member and to support the latter as concrete is directed into the machine. The support tube preferably has a longitudinal slot therein and is mounted to rotate around a longitudinal axis so that the tube can be rotated between a position with a slot opening upwardly and a position with the slot opening downwardly.

13 Claims, 7 Drawing Figures

REINFORCING MEMBER SUPPORT IN CONCRETE EXTRUDERS

FIELD OF THE INVENTION

This invention relates to a machine for extruding elongated articles of concrete-like moldable material having one or more reinforcing members therein and extending longitudinally thereof.

There are machines in the prior art for making concrete building components or slabs by extrusion. The concrete is forced under pressure through a mold, and the machine is moved forwardly by reaction as the material is forced against the molded portion of the article. However, with the known machines, it has been practically impossible to retain elongated reinforcing members, such as rods, wire rope, plain wire and the like, properly in position while the article is being formed.

This problem existed even when the reinforcing members were stressed cables. The reinforcing members have to extend through the area where the concrete is directed into the machine and are not properly supported at this time. As a consequence, the reinforcing members are very frequently forced vertically or laterally out of their proper position by the incoming concrete. As the concrete is compressed to its final density within the machine, the misplaced reinforcing members are retained in their improper positions in these finished articles.

Canadian Pat. No. 958,191, dated Nov. 26, 1974, discloses concrete extruder apparatus having tubes for guiding reinforcing rods or wires up to the area beneath the hopper through which the concrete is directed into the machine. These guide tubes terminate immediately ahead of this area so that the rods or wires can be moved vertically and laterally in the incoming concrete immediately ahead of the mold portion of the machine. If very stiff reinforcing rods are used in the machine of this patent, they will not be deflected very far out of their proper courses, but they still would be subjected to at least limited deflection. The patented machine would not be of much use for thin flexible reinforcing members, and it would be impossible to place the machine onto and to remove it off cables anchored at both ends for prestressed slabs.

Another disadvantage of the apparatus of Patent 958,191 is that the concrete is compressed by the spiral conveyors in the mold and by the lateral and vertical restraint of the mold. However, as fairly dry mixes have to be used in these extruders, the concrete is not always compressed firmly enough around the reinforcing rods to grip the latter.

Another example of a concrete extrusion machine is disclosed in Canadian Pat. No. 910,030, dated Sept. 19, 1972. This machine can be placed on and removed from pretensioned reinforcing members, but it does not include anything to prevent deflection of these reinforcing members by the incoming concrete.

SUMMARY OF THE INVENTION

The apparatus of the present invention is an improvement over that illustrated in Canadian Pat. No. 910,030. The present machine includes a supporting tube extending longitudinally of the machine right up to the mold thereof for each elongated reinforcing member. Each support tube supports the reinforcing member in its proper position as the concrete is directed into the machine, and said tube has a longitudinal slot therein through which the concrete enters the tube so that the reinforcing member is completely surrounded by concrete on entering the mold. Each support tube is mounted for rotation around a longitudinal axis whereby the tube can be rotated until its slot opens downwardly. This permits the machine to be placed over cables anchored at their opposite ends, said cables entering the tubes through the slots as the machine is lowered over the cables. Then the tubes can be rotated again to cause their slots to face upwardly into position to receive the concrete.

Another important feature of this invention is a forming element in the mold immediately following and aligned with each spiral conveyor over which the concrete is moved by the conveyor into and through the mold. A high frequency vibrator in the forming element liquifies the concrete in the mold between the formed article at the discharge end thereof and the pressure of the concrete entering the mold whereby the liquid concrete completely compacts around the forming element and each reinforcing element emerging from its support tube. As the tube supports the reinforcing element in its correct position, said element is in its correct position within the liquified concrete and consequently remains in its proper position within the molded article.

An extrusion machine in accordance with the present invention for making elongated articles of concrete-like moldable material having at least one reinforcing member therein and extending longitudinally thereof, comprises a conveyor chamber, an open-ended mold of a desired cross-sectional shape aligned with the chamber and in communication therewith, conveyor means in the chamber and extending to the mold, a support tube extending longitudinally of the chamber to the mold to receive and support an elongated reinforcing member extending therethrough and through the mold when an elongated article is to be made, said tube having a slot therein opening upwardly therefrom, and means for directing concrete-like material into the chamber around the conveyor means and through said slot into the support tube around the reinforcing member therein, said conveyor means being operable to move the concrete-like material under pressure through the mold around said reinforcing member.

In the preferred form of apparatus according to the invention, the conveyor means comprises one or more spiral conveyors, and the apparatus includes a forming element in the mold immediately following and in line with each spiral conveyor. A high frequency vibrator is located in this forming element so that the concrete is liquified around this element and the adjacent reinforcing member.

BRIEF DESCRIPTION OF THE DRAWINGS

An example of a preferred machine in accordance with this invention is ilustrated in the accompanying drawings in which.

DESCRIPTION OF THE PREFERRED EMBODIMENTS

Figure 1:
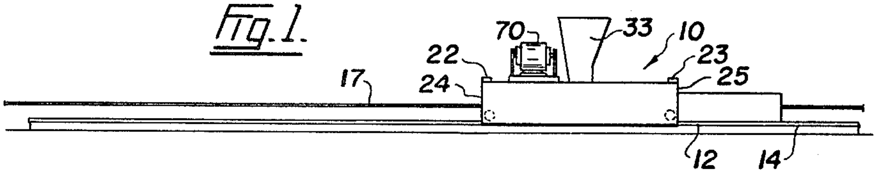
FIG. 1 is a diagrammatic side elevation of the concrete extruder positioned on a slab bed with prestressed reinforcing cables extending longitudinally of the bed.
Figure 2:
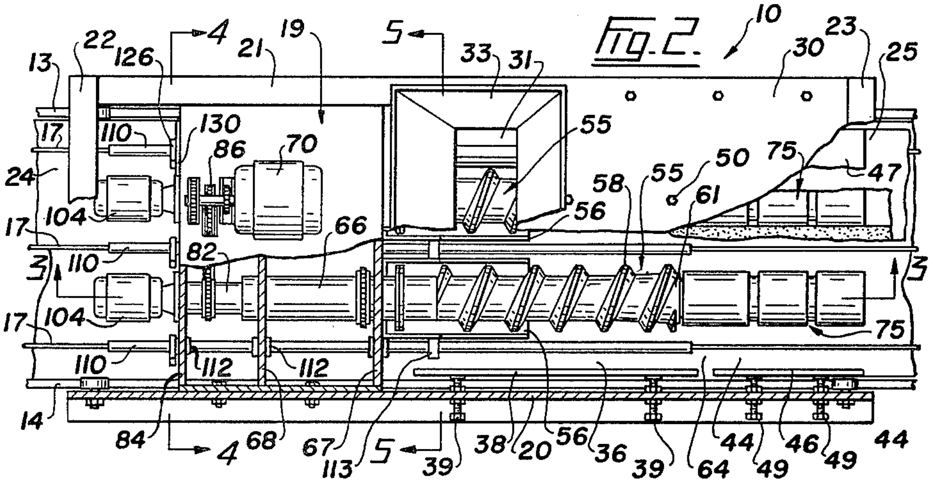
FIG. 2 is an enlarged plan view, partly in section, of the machine in operative position.

Referring to the drawings, 10 is an extrusion machine in accordance with this invention adapted to move over any suitable base during the formation of articles of moldable material, such as concrete slabs. The base may be the ground or any other suitable base structure which actually constitutes the bottom surface of the mold of the machine. In this example, the machine moves along a base 12 having vertical sides 13 and 14 which constitute rails for the machine. This base is supported in any suitable manner, such as by channels 15 and 16 upon which sides or rails 13 and 14 rest. One or more pretensioned reinforcing cables 17 extend longitudinal over and above base 12 and are anchored at their opposite ends by standard means, not shown.

Machine 10 includes a main frame 19 consisting of side members 20 and 21 extending the full length of the machine and interconnected by cross members 22 and 23 located respectively at the upstream end 24 and the downstream end 25 of the machine. A cover 30 is mounted on side members 20 and 21 and extends substantially the length of the machine. A relatively large slot 31 is formed in cover 30 spaced from the downstream end 25, and a hopper 33 is mounted on the cover and opens downwardly through this slot.

A conveyor chamber 36 is located beneath hopper 33 and is bounded by side members 20 and 21 and cover 30. Base 12 constitutes the bottom of this chamber. If desired, chamber 36 may be provided with side walls 38 at its opposite sides, said side walls being carried by bolts 39 extending through adjacent side member 20 and 21 so that these bolts can be turned to shift the side walls inwardly and outwardly to alter the lateral size of the chamber.

A mold 44 is located immediately downstream of chamber 36 at the downstream end 25 of the machine. This mold may have adjustable side walls or plates 46 at opposite sides thereof and an adjustable top plate or wall 47 immediately below cover 30. The side walls or plates 46 are adjustable inwardly and outwardly by bolts 49 extending through side members 20 and 21, while top wall or plate 47 is adjustable vertically by bolts 50 extending downwardly through cover 30. The width and depth of mold 44 may be adjusted by moving side plates 46 inwardly and outwardly, and the depth of the mold may be adjusted by shifting top plate 47 up or down. Base 12 forms the bottom of the mold.

One or more spiral conveyors 55 are mounted in and extend longitudinally of chamber 36, there being two of these conveyors illustrated in the drawings. Each conveyor extends through an open-topped trough 56 in the conveyor chamber beneath slot 31. As these conveyors are identical, only one will be described in detail.

Conveyor 55 consists of a spiral flight 58 wound around and secured to a hollow core shaft 59. This shaft may be of the same diameter from end to end thereof, or it may have a downstream end which flares outwardly a little relative to the axis of the shaft, as shown. The spiral flight 58 starts immediately below hopper 33 and extends to the downstream end 61 of the conveyor, this end being located at or just in the entrance end of mold 44. Core shaft 59 has an extension 66 at its opposite end supported by suitable bearings in cross walls 67 and 68 depending from cover 30 on the upstream side of hopper 33. Conveyor 55 is rotated by a motor 70 drivingly connected to the shaft extension and by sprocket and chain arrangement 71, said motor being mounted on cover 30. The troughs 56 are mounted on wall 67 and extend longitudinally of chamber 36 beneath their respective conveyors 55.

A forming element 75 is provided at the downstream end of conveyor 55 in mold 44. This forming element may be of any desired cross sectional shape. If it is round in cross section, it can be fixedly connected to the end of the conveyor so as to rotate therewith, or as preferred, it can be separately mounted so as to remain stationary or to rotate independently of the conveyor. In this example, the forming element is formed in three successive sections 77, 78 and 79 interconnected by dampeners 80. Section 77 of the forming element is mounted on the end of a shaft 82 which extends longitudinally through hollow core shaft 59 and projects beyond the extension 66 thereof. The upstream end of inner shaft 82 is journalled in a bearing in another cross wall 84 depending from cover 30 and spaced from cross wall 68. If desired, shaft 82 can be rotated by motor 70 through a sprocket and chain arrangement 86.

It is preferable to provide a high frequency vibrator 89 within section 77 of forming element 75, this section being at the entrance end 64 of mold 44. Any suitable vibrator may be used, such as an eccentric vibrator having a body 91 mounted on the end of a shaft 92, the longitudinal axis of this body being offset a little relative to the longitudinal axis of the shaft. Shaft 92 is journalled in bearings 94 carried by a housing 95 supported within forming element section 77 and having perforations 96 therein. Bearings 94 are lubricated by oil 98 in section 77, this section forming a housing or reservoir for the oil. The level of the oil is normally kept above the bottom of vibrator body 91 so that it splashes the oil to lubricate the bearings. Furthermore, during operation of the vibrator 89, the eccentric body 91 slides over the inner surface of housing 95 and creates a suction through perforations 96 to draw oil therethrough even when the level of the oil is low. A drive shaft 102 is connected to one end of the vibrator shaft 92 and extends longitudinally through hollow shaft 82 and beyond the upstream end thereof to a suitable source of power, such as an electric motor 104 carried by cross wall 84.

A support tube 110 is provided for each of the pretensioned cables or reinforcing members 17 in machine 10. In the illustrated example, there are three cables 17 and so there are three support tubes 110. The cables extend through the machine adjacent but spaced from the conveyors 55. There is one cable between the conveyors, and a cable outside of each of said conveyors. Each support tube extends from the upstream end of the machine into and through conveyor chamber 36 and terminates near the entrance of mold 44. Each tube is journalled in supports or bearings 112 in cross walls 67, 68, and 84, and in supports 113 mounted on the sides of troughs 56, and has a slot 115 therein extending longitudinally from end to end thereof. Each support 113 has a slot 116 therein opening downwardly therefrom for and in line with the adjacent cable 17, see FIG. 5. The slot 115 is large enough to permit a reinforcing member or cable 17 to enter and leave the tube, and the cross sectional area of the tube is a little larger than the diameter of the reinforcing member. Each of the cross walls 67, 68, and 84 has a vertical slot 117 for each cable 17 and opening downwardly from the lower edge of its respective wall, see FIGS. 4 and 5. Each slot 117 is aligned with one of the tubes 110 so that when these tubes are turned with their slots opening downwardly, these slots register with wall slots 117, at which time the machine can be lowered downwardly into place over the tensioned cables with the latter travelling through slots 117 and 115 to enter the tubes. When the tubes are rotated so that their slots open upwardly, the cables are supported within the tubes.

Figure 4:
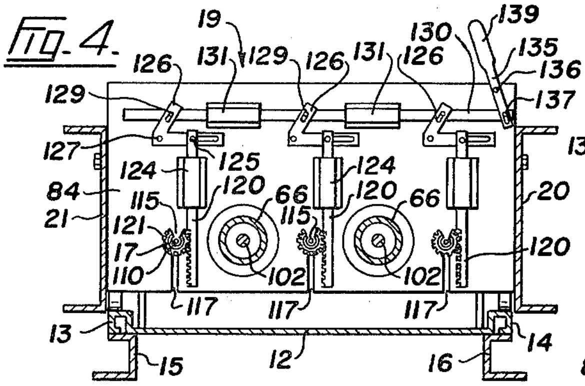
FIG. 4 is cross section taken on the line 4—4 of FIG. 2.
Figure 6:
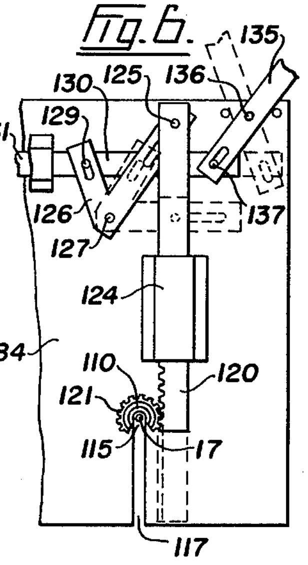
FIG. 6 is an enlarged fragmentary view showing one of the support tubes turned and opening downwardly.
Figure 5:
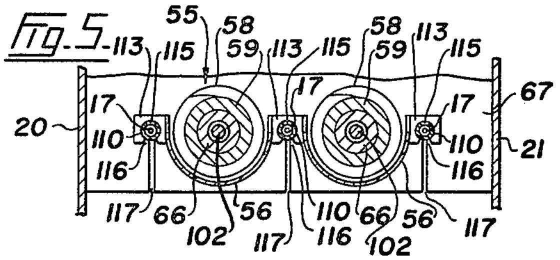
FIG. 5 is a cross section on the line 5—5 of FIG. 2 and showing the support tubes opening upwardly.
Figure 7:
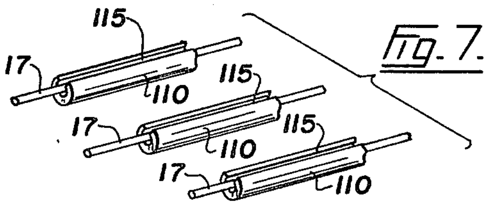
FIG. 7 diagrammatically illustrates three reinforcing elements or cables extending through three support tubes.
Figure 3:
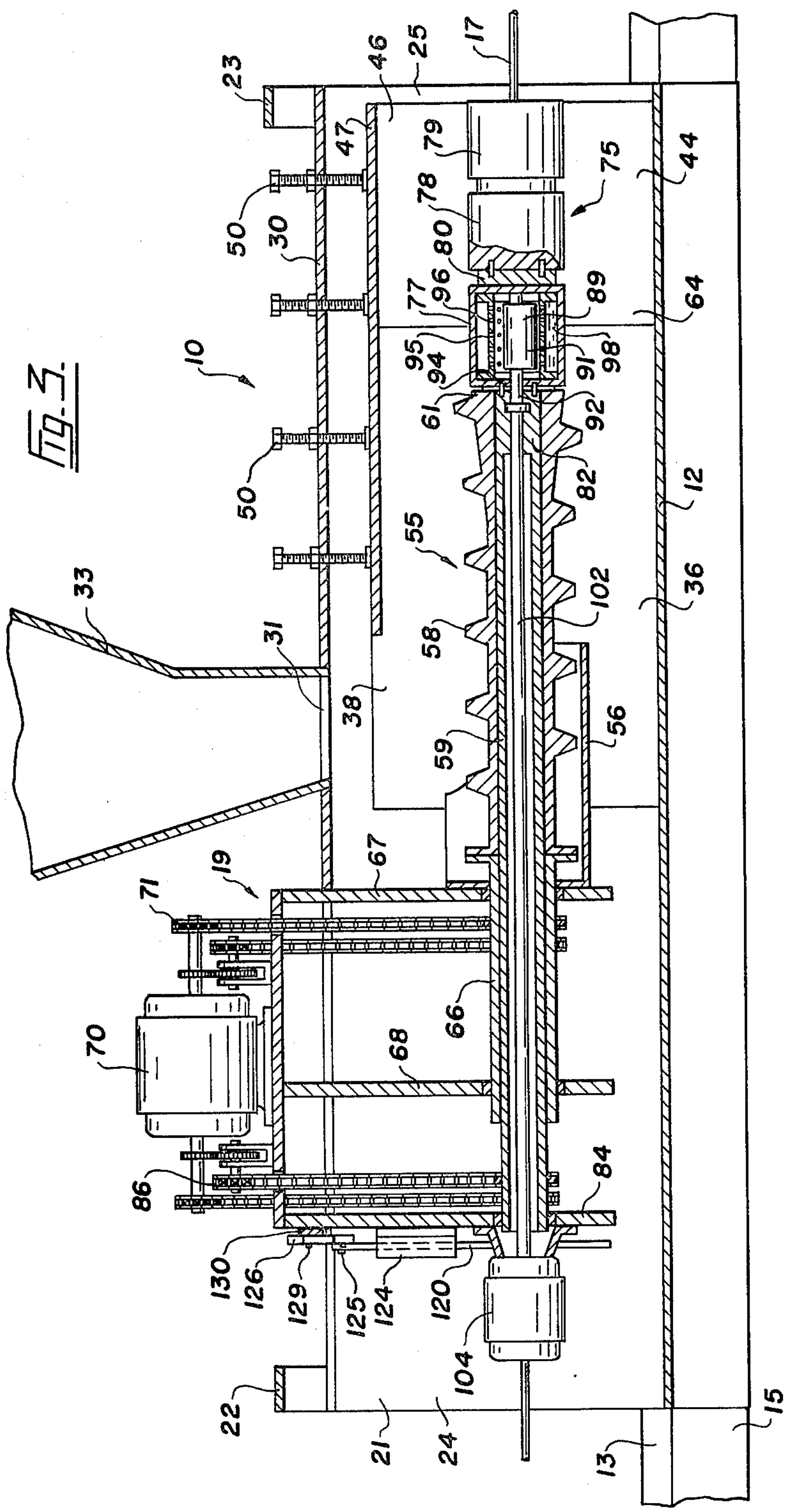
FIG. 3 is a enlarged longitudinal section through one of the spiral conveyors, and taken on line 3—3 of FIG. 2.

Suitable means is provided for selectively rotating tubes 110. In this example, a vertical rack 120 is provided for and adjacent each tube 110, see FIG. 4, said rack meshing with a pinion 121 mounted on the adjacent tube 110. Each rack 120 is mounted for vertical movement in a guide 124 mounted on the adjacent wall 84, and has an upper end connected by a pin 125 to one arm of a bell crank 126 pivotally mounted at 127 on the wall. The other end of the bell crank is connected by a pin 129 to a horizontal bar 130 slidably mounted in guides 131 mounted on wall 84. A lever 135 is swingably mounted intermediate its ends on wall 84 by a pin 136, and its lower end is connected by a pin 137 to an end of bar 130. When the handle 139 of lever 135 is swung inwardly relative to the machine, as shown in FIG. 4, the racks 120 have rotated the tubes 110 through their respective pinions 121 so that their slots 115 open upwardly. When the handle of lever 135 is swung outwardly, see FIG. 5, the bell cranks 126 lift racks 120 to rotate the tubes into the position with their respective slots opening downwardly and registering with wall slots 117. At this time, the machine can be placed on and removed from the reinforcing cables 17.

When it is desired to form a pretensioned concrete slab on bed 12, the reinforcing cables 17 are stretched in position in the usual manner at the required level above the bed. Then apparatus 10 is placed over the bed with the reinforcing cables moving upwardly through slots 117 and 115 into support tubes 110, said slots 115 opening downwardly at this time. After the tubes have been rotated to shift the slots to open upwardly, concrete is directed into hopper 33, and this concrete flows downwardly into chamber 36 around the spiral conveyors 55 and into the support tubes. The spiral conveyors 55 are rotated by motor 70 to move the concrete downstream through the conveyor chamber and into and through the mold 44. As the concrete is a fairly dry mix, it is compressed into a solid mass within the mold, and the reaction caused by the concrete entering the mold against the already formed concrete causes the machine to move in the direction away from the formed slab.

The concrete as it is directed into chamber 36 also enters support tubes 110 through their slots 115 so that the concrete surrounds the cables 17. This concrete moves with the main body of concrete towards and into the mold. During this operation, motor 104 rotates vibrator 89 so that the concrete surrounding the first section of forming element 44 between the concrete coming in under pressure and the formed slab in the mold is subjected to high frequency vibrations. This tends to liquify the concrete in this area so that any air therein is expelled and the mass becomes much denser than it would if it were not subjected to these high frequency vibrations. This ensures a very firm bond between the concrete and the reinforcing cables 17 as the concrete returns to the solid state within the mold and around the following forming element sections 78 and 79. The dampers 80 keep the vibrations from the latter sections.

If the forming elements 75 are connected to their respective spiral conveyors 55, the forming elements rotate with the conveyors. On the other hand, if the forming elements are mounted on shafts 102, these elements can be held against rotation during the operation, or, if they are circular in cross section, they can be rotated by motor 70. The speed of rotation and the direction of rotation of the forming elements is independent of the spiral conveyors. If the forming elements are other than round in cross section, they are not rotated during operation of the machine.

When machine 10 reaches the end of bed 12, lever 135 can be operated to cause the support tubes 110 to rotate until their slots 115 open downwardly, at which time the machine can be lifted off the bed and moved to another bed while the formed slab is left until the concrete sets sufficiently to enable the slab to be moved.

Although it is preferred to have support tubes with longitudinal slots therein and mounted for rotation as described above, said tubes may be non-rotatable with their slots opening upwardly or even without slots. In these alternatives, the tubes support the reinforcing cables in the area where the concrete enters the conveyor chamber and up to the mold, but the machine could not be placed on and removed from the cables while the latter are anchored at their ends. In any case, the concrete is compressed about the cables as they emerge from the support tubes into concrete moving towards the downstream end of the machine.

We claim:

1. An extrusion machine for making elongated articles of concrete-like moldable material having at least one reinforcing member therein and extending longitudinally thereof, comprising;
   - a conveyor chamber,
   - an open-ended mold of a desired cross-sectional shape aligned with one end of the chamber and in communication therewith,
   - conveyor means in the chamber and extend to the mold,
   - a support tube extending longitudinally of the chamber to the mold to receive and support an elongated reinforcing member extending therethrough and through the mold when an elongated article is to be made,
   - said tube having a slot therein opening upwardly therefrom, and
   - means for directing concrete-like material into the chamber and through said slot into the support tube around the reinforcing member therein, said conveyor means being operable to move the concrete-like material under pressure through the mold around said reinforcing member.

2. A machine as claimed in claim 1 comprising a high frequency vibrator in the mold adjacent said conveyor means and an end of the support tube.

3. A machine as claimed in claim 1 comprising a forming element of any cross sectional shape in the mold adjacent an end of the support tube and over which said material is moved by said conveyor means.

4. A machine as claimed in claim 1 comprising a forming element of any cross sectional shape in the mold adjacent an end of the support tube and over which said material is moved by said conveyor means, and a high frequency vibrator in said forming element to liquify the concrete-like material around said element and the adjacent reinforcing member.

5. A machine as claimed in claim 1 in which said supporting tube is mounted for rotation around a longitudinal axis thereof, and comprising means for rotating the tube around said axis between a position with the slot therein opening upwardly and a position with said slot opening downwardly.

6. A machine as claimed in claim 1 in which said supporting tube is mounted for rotation around a longitudinal axis thereof, and comprising means for rotating the tube around said axis between a position with the slot thereof opening upwardly and a position with said slot opening downwardly, and a forming element of any cross sectional shape in the mold and over which said material is moved by said conveyor means.

7. A machine as claimed in claim 1 in which said supporting tube is mounted for rotation around a longitudinal axis thereof, and comprising means for rotating the tube around said axis between a position with the slot thereof opening upwardly and a position with said slot opening downwardly, a forming element of any cross sectional shape in the mold and over which said material is moved by said conveyor means, and a high frequency vibrator in said forming element to liquify the concrete-like material around said element and the adjacent reinforcing member.

8. An extrusion machine for making elongated articles of concrete-like moldable material having at least one reinforcing member therein extending longitudinally thereof by forcing the material through a mold, said machine being moved forwardly by reaction as the material is forced against the molded portion of the article, comprising:

a conveyor chamber, an open-ended mold of a desired cross-sectional shape aligned with one end of the chamber and in communication therewith, a rotatable spiral conveyor in and extending longitudinally of the conveyor chamber and extending to the mold, a support tube extending substantially parallel with the spiral conveyor longitudinally of the chamber to the mold to receive and support an elongated reinforcing member extending therethrough and through the mold when an elongated article is to be made, said tube having a slot therein opening upwardly therefrom, and means for directing concrete-like moldable material into the chamber around the spiral conveyor and through said slot into the support tube around the reinforcing member therein, said conveyor being operable to move the concrete-like material under pressure through the mold around said reinforcing member.

9. A machine as claimed in claim 8 comprising a forming element of any cross-sectional shape in the mold immediately following the spiral conveyor and adjacent an end of the support tube, said conveyor moving the cement-like material over the forming element.

10. A machine as claimed in claim 8 comprising a forming element of any cross-sectional shape in the mold immediately following the spiral conveyor and adjacent an end of the support tube, said conveyor moving the cement-like material over the forming element, and a high frequency vibrator in said forming element to liquify the cement-like material around said element and the adjacent reinforcing member.

11. A machine as claimed in claim 8 in which the supporting tube is mounted for rotation around a longitudinal axis thereof, and comprising means for rotating the tube around said axis between a position having the slot thereof opening upwardly and a position having said slot opening downwardly.

12. A machine as claimed in claim 8 comprising a forming element of any cross sectional shape in the mold immediately following the conveyor, said conveyor moving the cement-like material over the forming element, a high frequency vibrator on said forming element to liquify the cement-like material around said element and the adjacent reinforcing member, said supporting tube being mounted for rotation around a longitudinal axis thereof, and means for rotating the tube around said axis between a position having the slot thereof opening upwardly and a position having said slot opening downwardly.

13. A machine as claimed in claim 8 comprising a forming element of any cross sectional shape in the mold immediately following the spiral conveyor and adjacent an end of the support tube, said conveyor moving the cement-like material over the forming element, said forming element being mounted so as not to be rotated by the conveyor.

* * * * *